Feb. 28, 1956 W. J. OOSTERKAMP 2,736,833
MEASURING CHAMBER FOR X-RAYS
Filed July 15, 1952
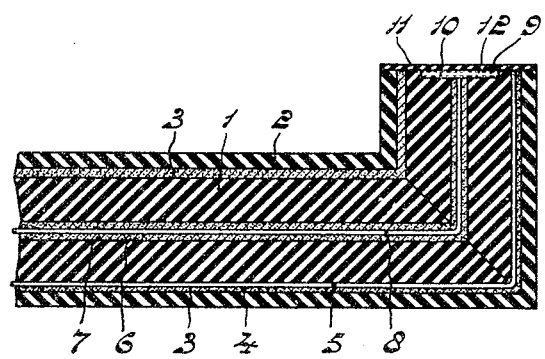
INVENTOR
WIBJE JOHANNES OOSTERKAMP
BY
AGENT

2,736,833
MEASURING CHAMBER FOR X-RAYS

Wijbe Johannes Oosterkamp, Eindhoven, Netherlands, assignor to Hartford National Bank and Trust Company, Hartford, Conn., as trustee Application July 15, 1952, Serial No. 298,890

Claims priority, application Netherlands August 9, 1951

2 Claims. (Cl. 313—93)

It is known that X-ray windows of beryllium or mica absorb rays of low penetration to a much lesser extent than do windows of glass. Many X-ray tubes having such windows are being used. Thus, measuring devices which provide an indication of the quantity of absorbed energy per unit volume of a tissue struck by X-rays must be connected for the altered composition of the X-ray radiation.

This invention relates to a part of such measuring devices, so-called measuring chambers, which are constituted by a space enclosed by walls and filled with some ionisable gas or gas mixture, preferably air. Enclosed in this space are two electrodes between which an electric potential difference is applied. Radiation by X-rays results in the gas being ionised so that an electric current is produced. The value of this current is a measure of the quantity of absorbed X-ray energy.

When judging the properties of a measuring chamber the wavelength of the X-rays must be allowed for. It may be expressed in the so-called halving thickness, which is understood to mean the thickness of a metal plate which, arranged in the beam of X-rays, cuts the ionisation current down to half its value. In the case of a heterogeneous beam, the mean penetration of the radiation is determined in this manner. Generally, use is made of an aluminium plate, copper being used for rays of greater penetration. The halving thickness increases with the penetration of the rays.

The X-rays pass from the anode of the X-ray tube first through the ray window and then through the wall of the measuring chamber. With X-ray tubes having a glass window, the absorption of long-wave rays in the window is considerable so that little trouble is involved in constructing the wall of the measuring chamber so that the ray absorption in it remains comparatively low. In recent tube-construction, these rays are absorbed by the window to a much lesser extent and hence by the wall of the measuring chamber relatively to a much more marked extent. This disadvantage has been mitigated by rendering the wall of the measuring chamber at the entrance side of the X-rays extremely thin. In this case, a wall of polystyrol foil about $20\mu$ in thickness is regarded as favourable. However, this wall is very fragile. In addition, it is readily liable to be distorted so that the volume of the chamber is subject to variation at the least contact with the wall and this renders measurement inaccurate.

The ionisation of the gas filling is due to secondary electrons. The latter may either be produced in the gas or may be dislodged from the wall of the chamber. For rays of very low penetration ionisation is due almost entirely to secondary electrons produced in the gas filling and the more the penetration increases the greater will become the influence of the electrons released from the wall. This causes the action of the measuring chamber to be greatly dependent on the wave length, since if the number of electrons per unit of volume released in the gas filling is different from that of the electrons dislodged from the wall, this results in that with radiations of different penetration the ionisation current no longer changes in proportion to the totally absorbed energy. This may be expressed by a number which designates the sensitivity of the chamber and shows the ratio between the virtual ionisation and the ionisation which would be brought about in the same gas volume but for the effect of the wall.

In addition to the wavelength range in which ionisation is brought about entirely in the gas volume and the range in which the wall electrons assist in ionisation, we distinguish towards the radiation of great penetration a further range in which the ionisation is due almost entirely to wall electrons.

The electron emission from the walls of the measuring chamber depends to a marked extent on the atomary composition of the wall material. It is proportional to the third power of the atomic number. In order that the wall electrons may assist in ionisation to comparatively the same extent as the electrons produced in the gas, the composition of the wall material is such that the effective atomic number corresponds as far as possible to that of the gas filling.

This has a limitation in that by far the major part of the wall is coated with a conductive layer. For this purpose use is preferably made of graphite or aquadag which, however, has a lower atomic number than air and other gases capable of being used in the measuring chamber. This disadvantage can be obviated by admixing the graphite with a substance of higher atomic number, for example 6% silicon. When mixing these substances to an extent such that even in the case of extending to a very thin layer even distribution of the admixed substance is obtained difficulty is encountered.

The use of the invention obviates the said disadvantages and provides a measuring chamber the action of which is substantially independent of the wave length throughout a large range. This range extends from radiation having a halving thickness of from 0.04 mm. Al to 1.5 mm. Al. Measurement of rays of even greater penetration is no longer affected by the transmitting power of the window in the X-ray tube.

According to the invention, in a measuring chamber the entrance window of which absorbs X-rays of long wavelength to a greater extent than those of short wavelength and the conductive wall coating of which is made of material having a lower atomic number than that of the gas filling, a relative sensitivity of the measuring chamber substantially not varying between the wavelengths of 0.04 mm. and 1.5 mm. Al is obtained by choosing the correct ratio between the thickness of the entrance window, the effective atomic number of the conductive layer and the depth of the ionisation space. Since for rays of great penetration in the said range, ionisation is due to secondary electrons which are dislodged primarily in the conductive layer, this ionisation per cc. will be less if the atomic number of the conducting layer is lower than that of the gas filling than if the wall has the same atomic number as the gas filling. In the case of rays of low penetration, ionisation is due in particular to secondary electrons produced in the gas filling and hence the ionisation per cc. is higher. This results in an increase in relative sensitivity of the chamber when the wavelength of the radiation increases. By choosing the thickness of the entrance window so that the ray absorption which occurs therein just compensates for the increase in sensitivity, it is possible to ensure the desired independence on the wavelength. The term "entrance window" is to be understood to mean that part of the wall of the measuring chamber through which the X-rays enter into the ionisation space.

The most adequate form of the measuring chamber is that of a flat box of annular section having two flat parallel walls which are coated each with a graphite layer and which are united by an edge of insulating material. The spacing between the walls is about 1 mm. and the entrance window is 0.2 to 0.5 mm. thick. A particular advantage of this form is that the spacing between the electrodes and the absorption in the flat wall are identical at any point.

A window thickness of 0.2 mm. renders the operation of the measuring chamber independent of the wavelength up to a halving thickness of 0.02 mm. Al. An entrance window which is 0.5 mm. thick has the advantage of being considerably more rigid but does not ensure independence on the wavelength beyond 0.04 mm. Al.

In order that the invention may be readily carried into effect, an example will now be described in detail with reference to the accompanying drawing, in which a measuring chamber of particularly suitable form is shown.

The so-called flat measuring chamber which is shown in the figure comprises an inner case 1 and an outer case 2 which are bent over at right angles and between which little play is left. The intermediate space 3 is filled with a conducting layer of carbon 4, for example graphite or aquadag, a conductor 5 being enclosed. The inner case 1 has a central bore 6 the wall of which is also coated with a conducting carbon layer 7, which encloses a conductor 8. One end of the inner case 1 has formed in it a recess 9 the depth of which is about 1 mm. and the diameter of which is about 10 mm. For practical reasons the volume of this space is chosen to be about 10 cm.³. The bottom of the recess is coated with a conducting carbon layer 10 which is in electrical connection with the carbon 7 within the bore 6 and hence with the conductor 8. The recess 9 is covered with a wall 11. The thickness thereof is, for example, 0.2 mm. and at the surface facing the centre it is coated with a conductive layer of carbon 12. The latter is electrically connected to the wall coating 4 of the intermediate space 3 and thus to the conductor 5. The material of which the chamber wall and the seal are made must be insulating and preferably have about the same absorption coefficient for X-rays as the conductive coating, polystyrol having been found to be a suitable substance. The chamber is air-filled. A potential difference required to be supplied by a measuring device is applied between the conductors. When the X-rays, which enter through the wall 11, ionise the air in the chamber an electric current is set up between the wall coating. This is a measure of the X-ray energy absorbed in air and due to the particular construction of the measuring chamber is substantially independent of the wavelength of the rays within the range capable of being used for superficial therapy.

What I claim is:

1. An ionization gauge comprising a housing, a gas-filled chamber in said housing; a pair of conductive wall coatings on opposite parallel walls of said chamber, said wall coatings being spaced apart by about 1 mm. and being constituted by a material having a lower atomic number than that of the gas-filling, a window in said housing communicating with said chamber for transmitting X-rays thereto said window being constituted by a material having a greater absorption for long wave-length X-rays than for short wave length X-rays, the thickness of the window and the effective atomic number of the conductive coatings relative to the depth of the chamber having values at which the gauge exhibits a substantially constant sensitivity to X-rays of a range of wave lengths corresponding to halving thicknesses between 0.04 mm. and 1.5 mm. Al and means for applying a potential between said pair of conductive coatings.

2. An ionization gauge comprising a housing, an air-filled chamber in said housing, a pair of thin carbon coatings on opposite parallel walls of said chamber and spaced apart a distance of about 1 mm., a window in said housing communicating with said chamber for transmitting X-rays thereto, said window having a thickness of between about 0.2 and 0.5 mm. and exhibiting greater absorption for longer wave-length X-rays, and means for applying a potential between said pair of carbon coatings.

References Cited in the file of this patent

UNITED STATES PATENTS

| | | |
|---|---|---|
| 2,094,318 | Failla | Sept. 28, 1937 |
| 2,145,866 | Failla | Feb. 7, 1939 |
| 2,291,406 | Paehr | July 28, 1942 |
| 2,590,108 | Liebson | Mar. 25, 1952 |